United States Patent [19]
Pahis

[11] Patent Number: 4,951,615
[45] Date of Patent: Aug. 28, 1990

[54] MOTION-CONVERSION MECHANISM FOR A FOUR STROKE OSCILLATING PISTON INTERNAL COMBUSTION ENGINE

[76] Inventor: Nikolaos S. Pahis, 8 Alpert Dr., Vernon, Conn. 06066

[21] Appl. No.: 394,745

[22] Filed: Aug. 17, 1989

[51] Int. Cl.$^5$ ............................................. F02B 53/00
[52] U.S. Cl. ..................................... 123/18 R; 74/30; 91/339
[58] Field of Search ............... 91/177, 339; 123/18 R, 123/18 A; 74/30

[56] References Cited

U.S. PATENT DOCUMENTS

| | | | |
|---|---|---|---|
| 575,540 | 1/1897 | Brammer et al. | 74/30 |
| 596,104 | 12/1897 | Entz | 74/30 |
| 668,958 | 2/1901 | Hallett | 74/30 |
| 2,821,861 | 2/1958 | Dunn | 74/30 |
| 4,395,977 | 8/1983 | Pahis | 123/197 AC X |

FOREIGN PATENT DOCUMENTS 200619  12/1982  Japan ................................ 123/18 R

*Primary Examiner*—Michael Koczo

[57] ABSTRACT

A four stroke internal combustion engine including a combustion chamber, a movable assembly, a stationary assembly and a motion conversion mechanism. The combustion chamber is formed between the stationary assembly and the movable assembly so as to be located radially of the predefinable pivot point. The movable assembly and the stationary assembly are cooperatively associated one with another such that the movable assembly is capable of being made to undergo oscillating motion about the aforementioned predefinable pivot point in a semicircular path about the stationary assembly. Motion is imparted to the movable assembly by virtue of the forces produced during combustion in the combustion chamber acting on a vane which projects outwardly of the movable assembly into the combustion chamber. The motion-conversion mechanism is cooperatively associated with the movable assembly whereby the motion-conversion mechanism is operative to convert the oscillating motion of the movable assembly into a continuous circular motion which is suitable for use for purposes of imparting rotation to a power output shaft.

4 Claims, 17 Drawing Sheets

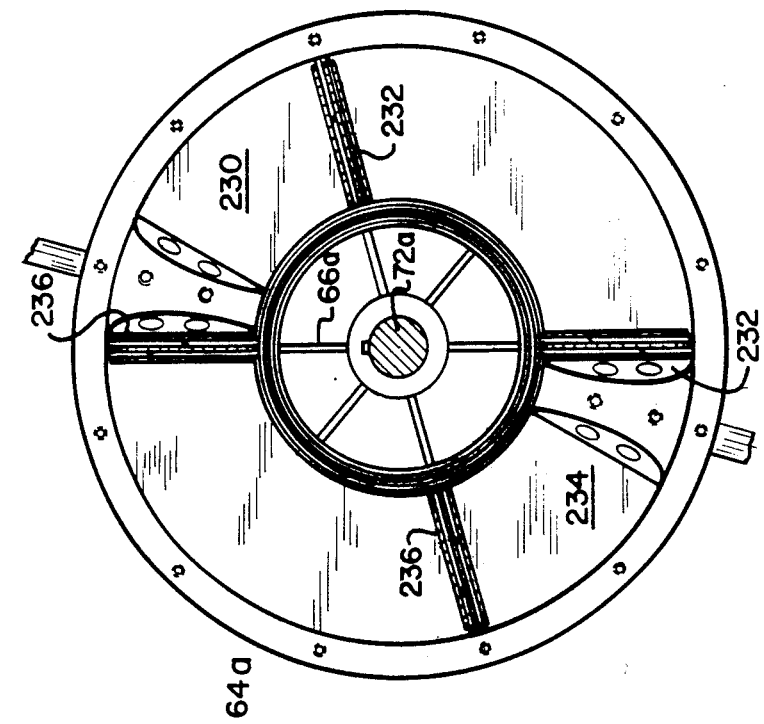
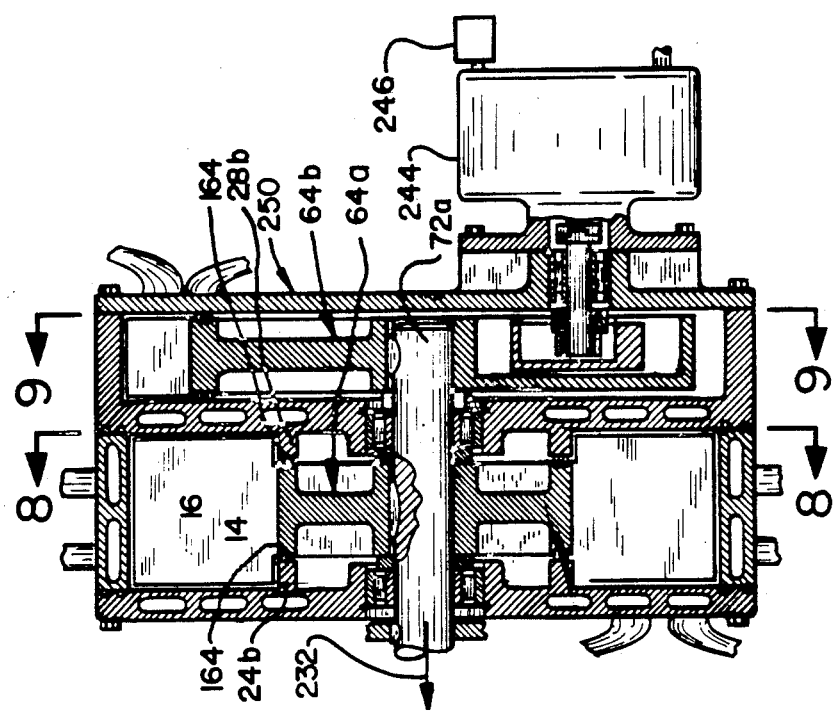
Fig. 8
Fig. 7

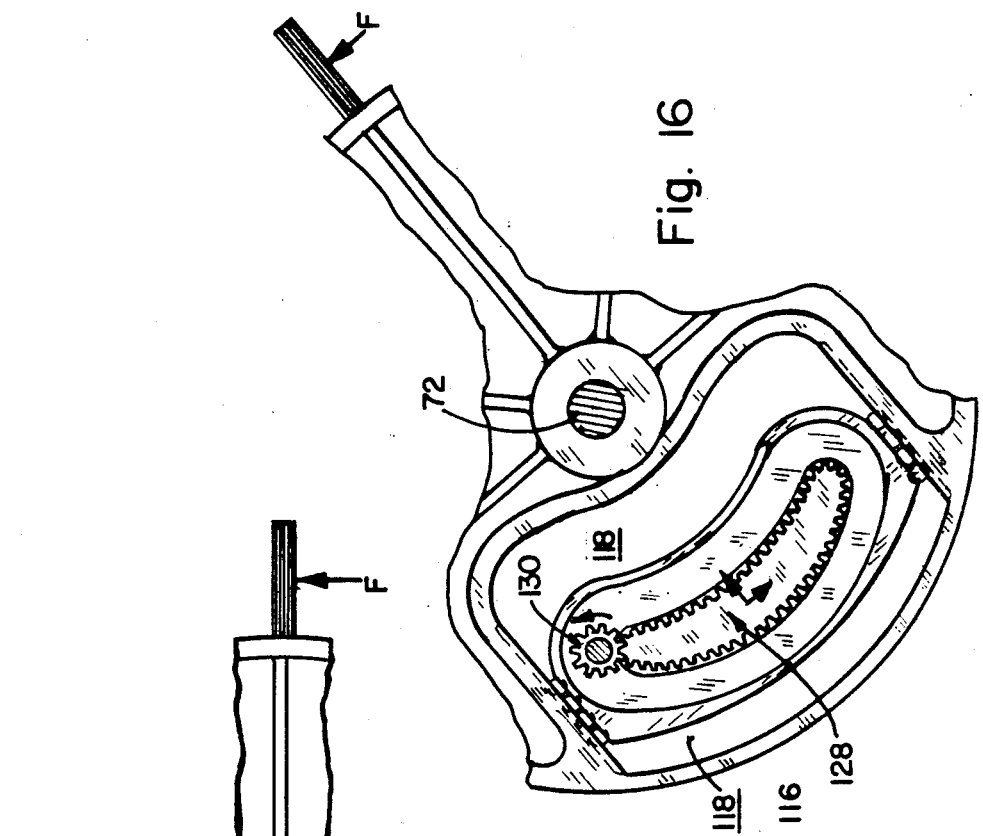
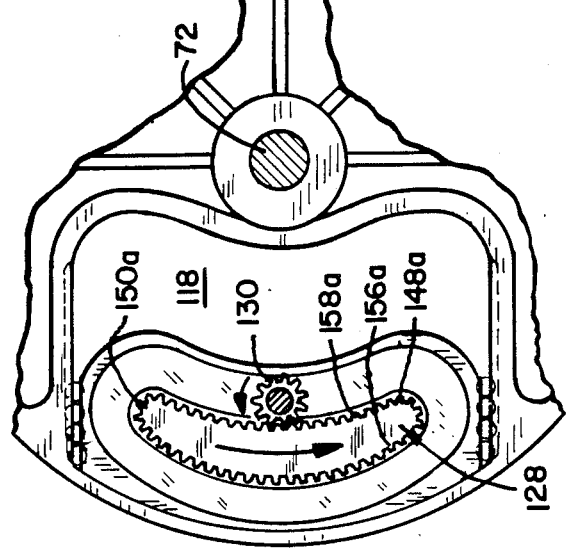

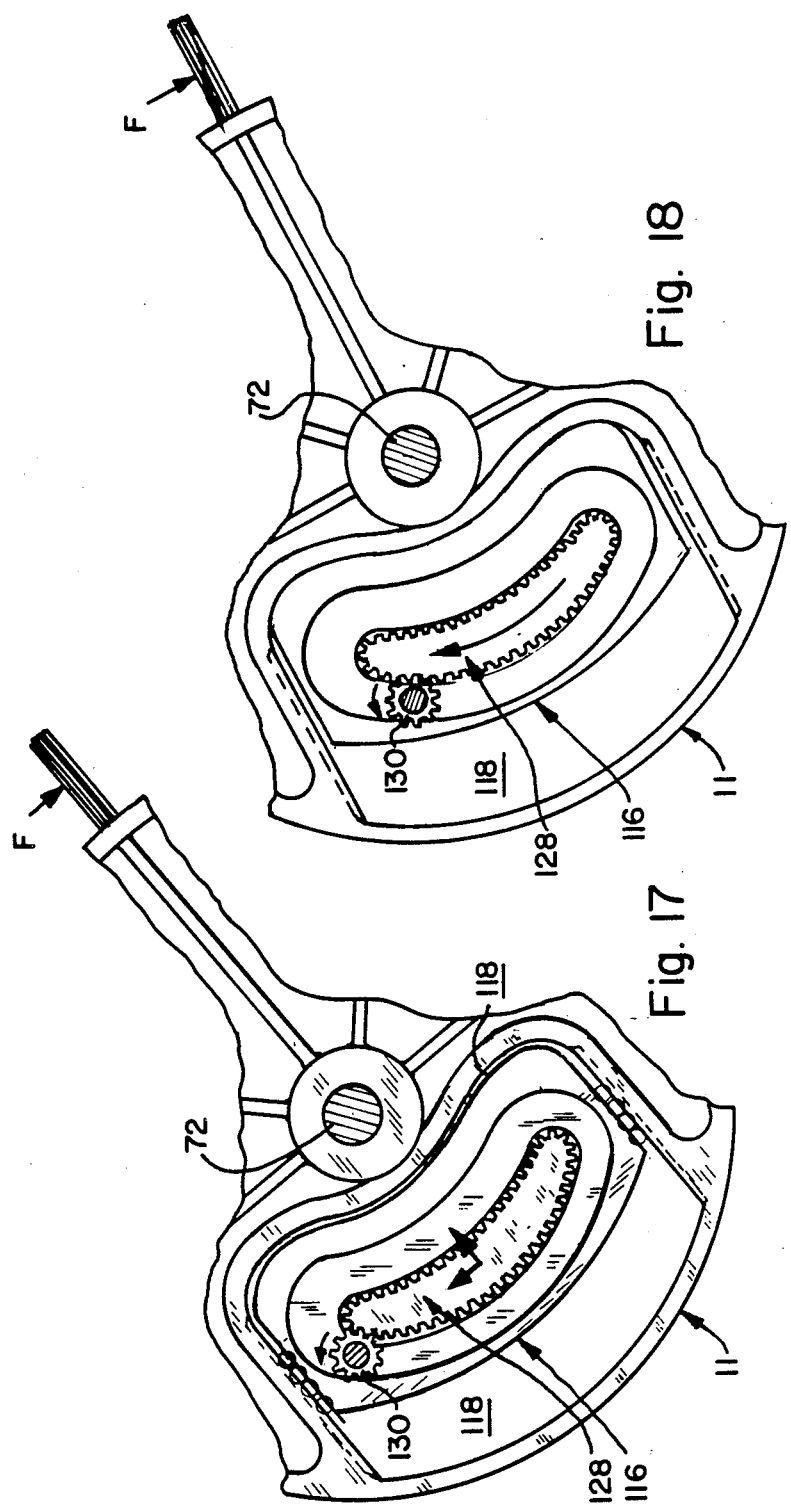

4,951,615

MOTION-CONVERSION MECHANISM FOR A FOUR STROKE OSCILLATING PISTON INTERNAL COMBUSTION ENGINE

BACKGROUND OF THE INVENTION

This invention relates to a four stroke internal combustion engine, and more specifically to a motion-conversion mechanism that is particularly suited for use in a four stroke internal combustion engine whereby the motion-conversion mechanism is operative to convert oscillating motion into a continuous circular motion which can be employed to rotate a power output shaft.

It has long been known in the prior art to provide internal combustion engines. More specifically, the prior art contains numerous examples of internal combustion engines that are suitable for use in a variety of different types of applications. By way of illustration in this regard, reference can be had to U.S. Pat. No. 4,395,977 which issued on Aug. 2, 1983 to the inventor of the present application U.S. Pat. No. 4,395,977 is directed to an internal combustion engine which embodies a particular form of power transmission mechanism that is designed to be operative for purposes of converting the linear reciprocating motion of a piston into the continuous rotary motion of a drive shaft. In accordance with the teachings of U.S. Pat. No. 4,395,977, the power transmission mechanism thereof is characterized in that a circular-type externally toothed gear, which is mounted on a rotatable power transmission shaft, engages the teeth of a framed-type gear such that they are held in constant engagement with the help of one or more independent and freely rotating follower rollers rolling on the external or internal surface of the framed-gear exactly at the opposite side of the point of engagement of the gear, and in that the power transmission shaft is mounted on bearing blocks which can be mounted fixed on the engine stator or can slide on sliding means attached to the engine stator in a linear or radial motion perpendicular to the carrier's linear reciprocating motion.

Although internal combustion engines constructed in accordance with the teachings of the aforementioned patent are capable of providing adequate performance, a need has nevertheless been evidenced for improvements to be made thereto. One such improvement which is deemed to be needed resides in the desire to be able to increase the power output which one is normally capable of realizing from a rotary engine of conventional construction. Namely, there exists a desire to realize an increase in the power output of the internal combustion engine by virtue of maximizing the utilization of the expended gases that are generated during the combustion which takes place in the combustion chamber of the internal combustion engine. Another such improvement which is deemed to be needed resides in the desire to be able to provide a capability for achieving variations in the speed and in the power output of the internal combustion engine. Yet another such improvement which is deemed to be needed resides in the desire to be able to maximize the expansion stroke in order to achieve the concomitant benefits that flow therefrom. Yet a further such improvement which is deemed to be needed resides in the desire to be able to attain a tighter gas seal in the combustion chamber from that which one is normally capable of achieving in a rotary engine that is of conventional construction. Still another such improvement which is deemed to be needed resides in the desire to be able to provide a capability for increasing or decreasing the time that it takes to accomplish various strokes of combustion. Yet a further such improvement which is deemed to be needed resides in the desire to improve the construction the rotor and the stator of a multi-combustion chamber internal combustion engine. To thus summarize, a need has been evidenced in the prior art for a new and improved motion-conversion mechanism suitable for use in a four stroke internal combustion engine whereby the motion conversion mechanism is operative to convert oscillating motion into a continuous circular motion which can be employed to rotate a power output shaft.

It is, therefore, an object of the present invention to provide a new and improved motion-conversion mechanism suitable for use in an internal combustion engine for purposes of effecting the conversion of oscillating motion into a continuous circular motion which can be employed as a means of imparting rotation to a power output shaft.

It is a further object of the present invention to provide such a motion-conversion mechanism particularly suited for use in an internal combustion engine which is characterized in that it is possible therewith to realize an increase in the power output of the internal combustion engine by virtue of maximizing the utilization of the expended gases that are generated during the combustion which takes place in the combustion chamber of the internal combustion engine.

It is another object of the present invention to provide such a motion-conversion mechanism particularly suited for use in an internal combustion engine which is characterized in that it is possible therewith to achieve variations in the speed and in the power output of the internal combustion engine.

It is still another object of the present invention to provide such a motion-conversion mechanism particularly suited for use in an internal combustion engine which is characterized in that it is possible therewith to maximize the expansion stroke in order to achieve the concomitant benefits that flow therefrom.

A further object of the present invention is to provide such a motion-conversion mechanism particularly suited for use in an internal combustion engine which is characterized in that it is possible therewith to attain a tighter gas seal in the combustion chamber from that which one is normally capable of achieving in a rotary engine that is of conventional construction.

A still further object of the present invention is to provide such a motion-conversion mechanism particularly suited for use in an internal combustion engine which is characterized in that it is possible therewith to increase or decrease the time that it takes to accomplish the various strokes of combustion.

Yet a further object of the present invention is to provide such a motion-conversion mechanism particularly suited for use in an internal combustion engine which is advantageously characterized by its ease of manufacture and its ease of assembly, as well as by the fact that it is relatively inexpensive to provide.

Surely a further object of the present invention is to provide such a motion converting mechanism which will simplify the construction of the internal combustion engine.

SUMMARY OF THE INVENTION

In accordance with the present invention there is provided a motion conversion mechanism which is particularly suited for use with an internal combustion engine of the type that includes a combustion chamber, a movable assembly and a stationary assembly, and when so employed therewith is operative to convert the oscillating motion of the movable assembly into a continuous circular motion which is suitable for use for purposes of imparting rotation to a power output shaft. More specifically, the internal combustion engine with which the subject motion-conversion mechanism is particularly suited to be employed embodies one or more combustion chambers which may consist of one or more segments, each being substantially semicylindrical in configuration, and which one suitably formed between the movable assembly and the stationary assembly so as to be located radially and/or axially of a predefinable pivot point. Moreover, the movable assembly and the stationary assembly of the internal combustion engine are cooperatively associated one with another such that the movable assembly is capable of being made to undergo oscillating motion about the aforementioned predefinable pivot point in a semicircular path about the stationary assembly. Motion is imparted to the movable assembly by virtue of the forces produced during combustion in the combustion chambers acting on a vane on vanes which projects outwardly of the movable assembly into the combustion chambers. The subject motion-conversion mechanism includes a circular rotatable gear which is mounted on a rotatable power output shaft for rotation therewith and a slidable gear carrier body which carries a special circular segment-like gear and which slides linearly and independently on sliding means. As such, the subject motion-conversion mechanism is operative to convert the oscillating motion of the movable assembly into a continuous circle motion that can be employed for purposes of rotating a power output shaft.

BRIEF DESCRIPTION OF THE DRAWING

FIG. 7 is a side elevational view partially in section of a third embodiment of an internal combustion engine embodying a motion-conversion mechanism constructed in accordance with the present invention;

FIG. 8 is a cross-sectional view of the internal combustion engine embodying a motion-conversion mechanism constructed in accordance with the present invention depicted in FIG. 7 taken substantially along the line 8—8 in FIG. 7;

FIG. 15 is a schematic representation of a motion-conversion mechanism constructed in accordance with the present invention depicting the components thereof illustrated in a first position;

FIG. 16 is a schematic representation of a motion-conversion mechanism constructed in accordance with the present invention depicting the components thereof illustrated in a second position;

FIG. 17 is a schematic representation of a motion-conversion mechanism constructed in accordance with the present invention depicting the components thereof illustrated in a third position; and FIG. 18 is a schematic representation of a motion-conversion mechanism constructed in accordance with the present invention depicting the components thereof illustrated in a fourth position.

DESCRIPTION OF A PREFERRED EMBODIMENT

Figure 1:
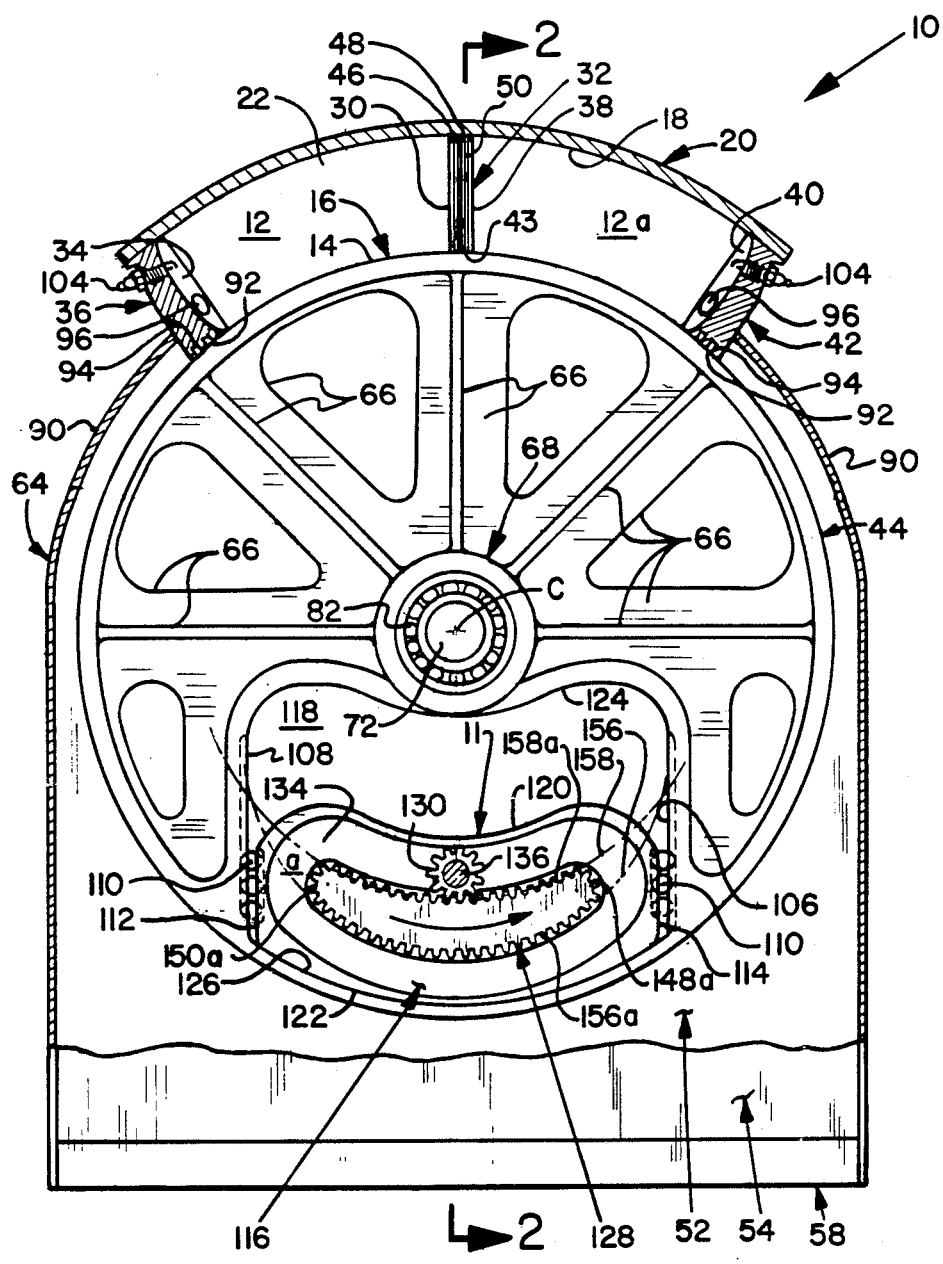
FIG. 1 is a side elevation view partially in section of an internal combustion engine embodying a motion-conversion mechanism constructed in accordance with the present invention.
Figure 2:
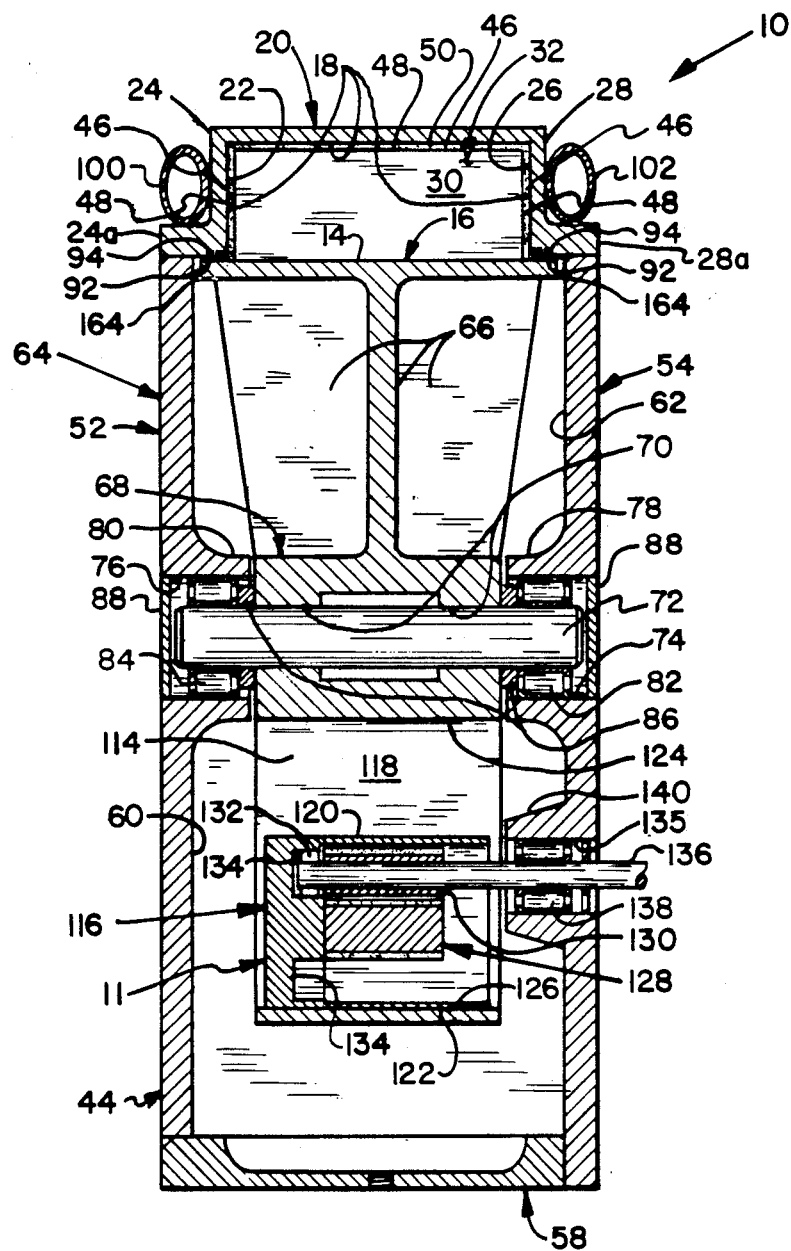
FIG. 2 is a cross-sectional view of the internal combustion engine embodying a motion-conversion mechanism constructed in accordance with the present invention depicted in FIG. 1 taken substantially along the line 2—2 in FIG. 1.

Referring now to the drawing, and more particularly to FIGS. 1 and 2 thereof, there is depicted therein an internal combustion engine, generally designated by the reference numeral 10, which embodies a motion-conversion mechanism, generally designated by the reference numeral 11, constructed in accordance with the present invention. The internal combustion engine 10 includes a combustion chamber which is comprised of a pair of substantially cylindrical chamber-like portions, the latter being denoted therein by the reference numerals 12 and 12a.

As best understood with reference to FIGS. 1 and 2 of the drawing, the substantially cylindrical chamber-like portions 12 and 12a comprise essentially the area which lies between the substantially smooth outer portion of the cylindrical surface 14 of the rotor, the latter being denoted therein generally by reference numeral 16 and the substantially smooth inner portion of the cylindrical surface 18 of the member 20. With further reference to FIG. 2, the member 20 as illustrated therein preferably embodies an inverted U-shaped configuration. Namely, the member 20 consists of the cylindrical surface 18 and the inner surfaces 22 and 26 of the depending sides 24 and 28. Preferably, the surfaces 22 and 26 of the depending side members 24 and 28 in accord with the illustrated embodiment thereof are formed integral with cylindrical surface 18 for a purpose yet to be described. Each of the pair of depending sides 24 and 28 terminates in a flange portion, the latter being denoted by the reference numerals 24a and 28a, respectively.

Continuing with the description of the cylindrical chamber-like portions 12 and 12a, the rotor 16 has a vane 32, securely fastened to the outer surface thereof for movement therewith through the use of any conventional form of fastening means such as being welded thereto. The vane 32 is intended to be operative for purposes of dividing the cylindrical chamber-like portion 12 substantially from the cylindrical chamber-like portion 12a. To this end, the vane 32 has a pair of faces 30 and 32. In accord with the illustrated embodiment thereof, each of the faces 30 and 38 comprises substantially flat rectangular surface. As such, the faces 30 and 38 are operative to define one end of each of the cylindrical chamber-like portions 12 and 12a. The other end of each of the cylindrical chamber-like portions 12 and 12a is formed by the concave surface 34 of the cylindrical member 36 and the concave surface 40 of the cylindrical member 42, respectively. It should thus now be readily apparent from the preceding description that the cylindrical chamber-like portion 12 comprises the area which is defined at the bottom by the outer portion of the cylindrical surface 14 of the rotor 16, at the top by the inner portion of the cylindrical surface 18 of the member 20, at the sides by the inner surfaces 22 and 26 of the depending sides 24 and 28, at one end by the face 30 of the vane 32 and at the other end by the concave surface 34, whereas the cylindrical chamber-like portion 12a comprises the area which is defined at the bottom by the outer portion of the cylindrical surface 14 of the rotor 16, at the top by the inner portion of the cylindrical surface 18 of the member 20, at the sides by the inner surfaces 22 and 26 of the depending sides 24 and 28, at one end by the face 38 of the vane 32 and at the other end by the concave surface 40.

The member 20 along with the members 36 and 42 to which reference has been had herein previously comprises a portion of the stationary assembly 64, which together with the movable assembly 44, combine to form the internal combustion engine 10 which has the nature of construction that is depicted in particular in FIGS. 1 and 2 of the drawing. A description will now be set forth herein of the remainder of the stationary assembly 64. For this purpose, reference will be had in particular to FIG. 2 of the drawing. As best understood with reference to FIG. 2 of the drawing, the flange portions 24a and 28a of the depending sides 24 and 28 of the member 20 are securely fastened through the use of any conventional form of fastening means (not shown) to a corresponding one of a pair of side support blocks, 52 and 54 such as to be suitably supported thereby. The side support blocks 52 and 54 in turn are suitable mounted on a base, generally designated by the reference numeral 58, through the use of any suitable conventional form of mounting means (not shown) so as to extend in parallel relation one to another such that the inner surfaces 60 and 62 of the side support blocks 52 and 54, respectively, face one another in the manner illustrated in FIG. 2 of the drawing.

Next reference will be had to the movable assembly 44. The movable assembly 44 is designed to be suitably mounted on the stationary assembly 64 such as to be movable relative thereto. More specifically, the rotor 16, which comprises the principal component of the movable assembly 44, is suitably mounted in a manner that will be described herein subsequently in supported relation on the side support blocks 52 and 54 of the stationary assembly 64 for movement relative thereto. There exists a need first to describe herein the nature of the construction of the rotor 16 itself. To this end, as best understood with reference to FIG. 2 of the drawing the rotor 16 includes a hub 68, which is suitably located at the center of the rotor 16, and a plurality of stiffeners, which for ease of reference are each denoted by the same reference numeral 66 in FIGS. 1 and 2 of the drawing. The stiffeners 66 preferably are formed integral with the hub 68 so as to project outwardly in a radial direction therefrom. At their outer end the stiffeners 66 terminate at the opposite side of the cylindrical surface 44 to which there has been reference herein previously. The hub 68 has an opening 70 that is suitably formed through the center thereof. This opening 68 is suitably dimensioned so as to be capable of receiving therein with a sufficiently tight fit such as to prevent relative movement therebetween a shaft 72.

Continuing, as best understood with reference to FIG. 2 of the drawing the ends of the shaft 72 are designed to be received so as to be movable relative thereto in the hubs 78 and 80 that are suitably provided for this purpose in the side support blocks 54 and 52, respectively. More, specifically, the ends of the shaft 72 in accord with the illustrated embodiment of the internal combustion engine 10 preferably are supported in bearings 82 and 84. The bearings 82 and 84 in turn are supported in known fashion in mounted relation in the openings 74 and 76 with which the hubs 78 and 80 are suitably provided. If so desired, spacers seen at 86 in FIG. 2 of the drawing may be employed in the openings 74 and 76 in the hubs 78 and 80 for purposes of effecting the proper positioning therewithin of the bearings 82 and 84 and concomitantly the respective ends of the shaft 72. Also, if so desired, sealing means 88 may be mounted in the openings 76 that are formed in the hubs 78 and 80 for purposes of sealing off the openings 74 and 76 from the surrounding environment, i.e., to prevent the entrance therewithin from the surrounding environment of contaminants. Finally, as illustrated in FIG. 1 of the drawing, the internal combustion engine 10 preferably is also provided with a pair of end members, 90, that with the side support blocks 52 and 54 are operative to provide a complete enclosure for the operating components of the internal combustion engine 10.

A description will now be had of the mode of operation of the internal combustion engine 10 with particular reference being had for this purpose to FIGS. 1 and 2 of the drawing. In known fashion, combustion is designed to occur within the chamber-like portions 12 and 12a that are best seen with reference to FIG. 1 of the drawing. More specifically, the four strokes of combustion, i.e., intake, compression, expansion and exhaust, take place within the chamber-like portions 12 and 12a. To this end, in a manner to which further reference will be had hereinafter, fuel is supplied to the interior of the chamber-like portions 12 and 12a whereupon it is ignited therewithin, the gases created by virtue of the ignition and subsequent burning of the fuel expand in turn within the chamber-like portions 12 and 12a, and in doing so act upon the respective faces 30 and 38 of the vane 32 such as to cause the vane 32 to move first in one direction and then in the opposite direction, i.e., to oscillate to and fro. Furthermore, since the vane 32 is securely affixed to the rotor 16, the vane 32 operates to transmit the oscillating motion thereof to the rotor 16 thereby causing the latter to also oscillate in unison with the vane 32.

However, for the gases generated in the chamber-like portions 12 and 12a as a consequence of the ignition of the fuel therein to be effective in causing the vane 32 to undergo the aforedescribed oscillating motion, the chamber-like portions 12 and 12a must not only be effectively sealed off one from another, i.e., chamber-like portion 12 from chamber-like portion 12a and vice versa, but in addition the chamber-like portions 12 and 12a must also be effectively sealed off from the atmosphere surrounding the exterior of the internal combustion engine 10. The manner in which the aforereferenced gas-tight seals are accomplished is as follows. Considering first the gas-tight seal which is established between the chamber-like portion 12 and the chamber-like portion 12a, as described herein previously the vane 32 is fixedly mounted on the circumference of the rotor 16 such as by being welded thereto. As such, a gas-tight seal is created between the vane 32 and the cylindrical surface 14 of the rotor 16 at the point of attachment of the vane 32 to the rotor 16.

On the other hand, between the free sides of the vane 32 and the smooth inner portion of the cylindrical surface 18, 22 and 26 of the member 20 there exists a gap 46. The gap 46 is intended to function as an antifriction means, i.e., to reduce the friction which would otherwise be created as the vane 32 is made to reciprocate to and fro, if the vane 32 were to extend into abutting engagement with the smooth inner portion of the cylindrical surface 18, and surfaces 22 and 26 of the member 20. Thus, for antifriction purposes it is desirable that a gap 46 exists between the free sides of the vane 32 and the inner smooth portion of the cylindrical surface 18, and surfaces 22 and 26 of the member 20, but at the same time there is a need to prevent the gases generated as a consequence of the ignition and subsequent burning of fuel within the chamber-like portions 12 and 12a from passing through this gap 46. In order to prevent the gases from passing through the gap 46, one or more suitably dimensioned sealing rings 50 are mounted in supported relation on the vane 32 such as to project outwardly therefrom, in the manner denoted by the reference numeral 48, into the gap 46. In doing so, the sealing rings 50 are suitably designed so as to be effective to create a gas-tight seal between the free sides of the vane 32 and the inner smooth portion of the cylindrical surface 18, and surfaces 22 and 26 of the member 20, while at the same time being operative to enable the vane 32 to oscillate to and fro with a minimum amount of friction being created between the free sides of the vane 32 and the inner smooth portion of the cylindrical surface 18, and surfaces 22 and 26 of the member 20.

Continuing with the description of the mode of operation of the internal combustion engine 10, the chamber-like portions 12 and 12a, in a manner to which further reference will be had hereinafter, are each provided with air inlet means 96 of conventional construction, and with gas outlet means of conventional construction, omitted from the drawing in the interest of maintaining clarity of illustration therewithin. The air inlet means 96 and the gas outlet means (not shown) are designed to be opened and closed in synchronous relationship one with another in conventional fashion through the use of any conventional means (not shown) known in the prior art to be suitable for use for this purpose. The aforedescribed air inlet means 96 are suitably connected through the use of any conventional form of connecting means (not shown) in fluid flow relation with the duct 100 whereby air is supplied to and through the duct 100 to the air inlet means 96. Similarly, the gas outlet means (not shown) are suitably connected through the use of any conventional form of connecting means (not shown) in fluid flow relation with the duct 102 whereby the combustion gases after compression and expansion in the chamber-like portions 12 and 12a pass through the gas outlet means (not shown) and into the duct 102 whereupon they are discharged from the internal combustion engine 10.

To effect the necessary gas-tight seal between the chamber-like portions 12 and 12a and the atmosphere surrounding the exterior of the internal combustion engine 10 particularly during the time when the compression and expansion strokes are taking place, the internal combustion engine 10 is provided with additional sealing means. This additional sealing means in accord with the illustrated embodiment of the internal combustion engine 10 takes the form of sealing members 92 that are suitably received within grooves, 94, which are provided in the flange portions 24a and 28a and in the members 36 and 42 for this purpose. As such, the sealing members 92 are operative to effect a gas-tight seal between the cylindrical surface 14 of the rotor 16 and the flange portions 24a and 28a of the depending side members 24 and 28, the smooth cylindrical surfaces of members 36 and 42 and with these surfaces being adjacent to the surface 14 of rotor 16 of the member 20 and thus between the chamber-like portions 12 and 12a, the substantially smooth outer portion of the cylindrical surface 14 of the rotor 16 and the smooth inner portion of the cylindrical surface 18, 22 and 26 of the member 20, i.e., between the interior of the chamber-like portions 12 and 12a and the exterior of the interior of the internal combustion engine 10.

To summarize, in accord with the mode of operation of the internal combustion engine 10 embodying the nature of the construction depicted in FIGS. 1 and 2 of the drawing, fuel is injected into, i.e., supplied to the interior of the chamber-like portions 12 and 12a in synchronous relation by means of any suitable conventional form of fuel supply means, which has been omitted from the drawing in the interest of maintaining clarity of illustration therewithin, whereupon the fuel is ignited by the ignition means 104. More specifically, the fuel is ignited sequentially in first one then in the other one of the chamber-like portions 12 and 12a. Following ignition, the gases that are generated as a result of the fuel burning during the compression and the expansion thereof produce forces that in well-known fashion act alternatively first on one of the faces 30 and 38 of the vane 32 and then on the other one of the faces 30 and 38. This in turn causes the vane 32 to first move in one direction and then to move in the opposite direction, i.e., to oscillate to and fro within the chamber-like portions 12 and 12a, with the length of the stroke of the vane 32 in either direction being limited by the dimensions of the chamber-like portions 12 and 12a and the quantity of gases that is generated by the burning of the fuel in the chamber-like portions 12 and 12a. Thereafter the gases of combustion are exhausted from first one and then the other of the chamber-like portions 12 and 12a through the gas outlet means (not shown) into the duct 102 and from the duct 102 to the atmosphere.

Reference will now be had particularly to FIGS. 1 and 2 of the drawing for purposes of describing the nature of the construction and the mode of operation of the motion-conversion mechanism 11, which in accordance with the present invention is designed to be cooperatively associated with an internal combustion engine that is constructed by way of exemplification and not limitation in the manner of the internal combustion engine 10 depicted in FIGS. 1 and 2 of the drawing. As best understood with reference to FIG. 1 of the drawing, the motion-conversion mechanism 11 includes a gear carrier 116. In a manner to which further reference will be had hereinafter, the gear carrier 116 is designed to be cooperatively associated with the rotor 16 of the internal combustion engine 10 and in particular the opening 118 with which the rotor 16 is suitably provided for this purpose. More specifically, the gear carrier 116 is suitably supported within the opening 118 so as to be capable of sliding movement within the opening 118 in a substantially vertical direction as viewed with reference to FIG. 1 of the drawing. This sliding motion is accomplished in accord with the best mode of the invention by interpositioning of sliding means 110, shown in dotted lines in FIG. 1 between the parallel surfaces denoted by the reference numerals 106 and 108 of the rotor 16 and the gear carrier 116. Although the sliding means 110 has been illustrated in the drawing, it is to be understood that any other conventional form of sliding means suitable for use in the aforedescribed manner could be substituted therefor without departing from the essence of the present invention.

With further reference to the sliding means 110, as best understood with reference to FIG. 1 of the drawing, there is a first sliding means 110 suitably supported so as to be positioned in interposed relation between the surface 106 and the gear carrier 116, and a second sliding means 110 suitably supported so as to be positioned in interposed relation between the surface 108 and the gear carrier 116. Insofar as the surfaces 106 and 108 are concerned, they comprise opposite side walls that serve to define two sides of the opening 118. The remaining two sides of the opening are defined by the two surfaces 124 and 126, respectively. Of particular note here is the configuration which each of the two surfaces 124 and 126 embodies. To this end, as will be best understood with reference to FIG. 1 of the drawing the surface 124 embodies a configuration which is designed to be complementary in nature to the configuration of the upper surface 120, as viewed with reference to FIG. 1, of the gear carrier 116. Whereas the surface 124, as best understood with reference to FIG. 1 of the drawing, embodies a configuration which is designed to be complementary in nature to the configuration of the lower surface, 22, as viewed with reference to FIG. 1 of the gear carrier 116. Complementary configurations 120 and 124, 122 and 126 may vary in form without departing from the essence of the invention. In summary, therefore, it should be readily apparent from a reference to FIG. 1 of the drawing and the preceding description that the surfaces 106, 108, 124 and 126 collectively serve to define the circumference of the opening 118. Similarly, it should be readily apparent from a reference to FIG. 1 of the drawing and the preceding description that the surfaces 106, 108, 124 and 126 also perform the function of establishing the extent to which the gear carrier 116 is free to move in a vertical direction, as viewed with reference to FIG. 1 of the drawing, to and from within the opening 118 between a first position as depicted in FIG. 1 wherein the surface 122 of the gear carrier 116 is positioned in engaging relation with the surface 126 and a second position (not shown) wherein the surface 120 of the gear carrier 116 is positioned in engaging relation with the surface 124. Although not depicted in the drawing, it is to be understood that some form of cushioning means, without departing from the essence of the invention, could be mounted on the leading edge of each of the surfaces 124 and 126 so as to be operative to cushion the force when the surface 120 of the gear carrier 116 moves into engaging relation with the surface 124 and when the surface 122 of the gear carrier 116 moves into engaging relation with the surface 126.

Continuing with the description of the motion-conversion mechanism 11, suitably supported on the gear carrier 116 for movement therewith as well as for movement relative thereto is a specially, cylindrically shaped, segment gear 128. Further reference will be had hereinafter to the movement which the segment gear 128 is capable of undergoing. However, for the moment it is sufficient to simply note at this time that the segment gear 128 is mounted on the gear carrier 116 through the use of any conventional form of support means (not shown) that is suitable for use for such a purpose, i.e., to enable the segment gear 128 to undergo the type of movement described above. The segment gear 128 is designed to coact with a gear 130, such that the segment gear 128 and the gear 130 are designed to remain in constant engagement with one another. In this regard, both the segment gear 128 and the gear 130 have teeth formed around the external circumference thereof. The gear 130, as best understood with reference to FIG. 2 of the drawing, is designed to be fixedly mounted on the shaft 136, such that any rotation to which the gear 130 is subjected is in turn transmitted therefrom to the shaft 136 thereby causing the shaft 136 to likewise rotate. In accordance with the embodiment of the invention illustrated in FIG. 2 of the drawing, the shaft 136 has one end thereof supported in a follower roller. The follower roll 132 is supported for movement relative thereto in an opening 134, which is suitably formed for this purpose in the gear carrier 116. In addition, the other end of the shaft 136 is made to pass through a bearing 138, such that the shaft 136, which is designed to be operative as the output shaft for the internal combustion engine 10, projects outwardly therefrom through an opening 135, formed for this purpose in the portion 140 of the side support block 54. From the preceding description when considered in conjunction with a reference to FIG. 2, it should now be readily apparent that as a consequence of the manner in which the shaft 136 is supported for rotation, i.e., with one end thereof positioned in the follower roller 132 and with the remainder of the shaft 136 being supported intermediate its ends by means of the bearing 138, the gear 130 which is fixedly mounted on the shaft 136 is caused to remain in constant engagement with the segment gear 128.

For purposes of completing the description of the embodiment of the invention that is illustrated in FIGS. 1 and 2 of the drawing, it is to be understood that although the segment gear 128 is depicted in FIGS. 1 and 2 as having teeth formed around the exterior thereof the segment gear 128 could without departing from the essence of the present invention be provided with a hollow interior such that the teeth thereof are positioned internally thereof rather than on the exterior thereof. In such a case, rather than having one end thereof mounted in supported relation in the follower roller 132, the shaft 136 which has the gear 130 fixedly mounted thereon would have the aforereferenced one end thereof supported in a bearing 138' shown in FIG. 20 of the drawing such as the bearing 138, which is suitably supported in an opening 135' shown in FIG. 22 formed in a portion of the side support block 57' in a manner similar to the manner in which the opening 135 is formed in the portion 140 of the side support 54 whereby the gear 130 is still caused to remain in constant engagement with the segment gear 128' notwithstanding the fact that the segment gear 128' has teeth provided on the interior thereof rather than the exterior thereof shown in FIG. 19 of the drawing. By using an internally teethed gear 128', it makes it possible to connect a plurality of independent motion conversion mechanisms and to impart rotation through one output shaft shown in FIG. 23 of the drawing without departing from the essence of the invention. With further reference to the embodiment of the invention that is illustrated in FIGS. 1 and 2 of the drawing, should it be desired to reduce the forces acting on the shaft, this may be accomplished by changing the location of the sealing members 92 and thereby the manner in which forces are transmitted thereby. Namely, instead of positioning the sealing members 92 in grooves 94 that are formed in the flange portions 24a and 28a such that the forces are transmitted to the cylindrical surface 14 of the rotor 16, the sealing members 92 could be positioned in grooves (not shown) formed for this purpose in the depending side members 24 and 28, such that the sealing members 92 slide on surfaces 164 of rotor 16.

Reference will now be had particularly to FIGS. 1 and 2 of the drawing for purposes of describing the nature of the construction of special gear 128. With the vane 32 being mounted rigidly to rotor 16 it moves in a semicircular reciprocating motion within specified limits in the area of the combustion chambers 12 and 12a to and fro. The rotor 16 moves in unison motion with vane 32, also the gear carrier 116 which lies within the 118 provided in rotor 16 undergoes the same movement.

It is best suited but not limited to have the gear carrier 116 as much as possible in a resting position during the operation of the engine without departing from the essence of the present invention in order to have a smooth engagement of gears 128 and 130. Thus does there derive the need for the special gear 128 which is mounted in the gear carrier 116. Gear 128 is formed within the limits of an area denoted with the letter a in drawing FIG. 1 and with area a enclosed within the limits of two semicircular paths 156 and 158 also in drawing FIG. 1. Each of said semicircular paths 156 and 158 is similar to the path circle of a gear segment of that particular side of the gear 128. The formation of path 156a of gear 128 is formed with radius R1. The formation of path 158 which is the base circle for the first nontransitional section of gear segment 158a of gear 128 is formed with radius R2. Needless to say, the radius denoted with the letter R2 is greater than the radius denoted with the letter R1 in FIG. 1 of the drawing. As gear segment 156a of special gear 128 engages the circular gear 130, the surface 122 of the aforedescribed gear carrier 116 rests on the surface 126 of the rotor 16. When gear segment 156a of special gear 128 is engaging the circular gear 130, the surface 120 of the aforedescribed gear carrier 116 rests on the surface denoted 124 of the rotor 16 in FIGS. 1 and 2 of the drawing.

Furthermore in order to have a continuous engagement of gear 128 to gear 130 it is essential to provide the special gear with two transition gear segments 156a and 158a. Continuous engagement of gear 128 to gear 130 is essential in order to impart continuous circular motion of the output shaft 130 as segment gear 128 transits around circular gear 130.

The nature of the construction of the segment gear 128 which gives rise to the characterization thereof as being special will now be discussed. Reference will be had for this purpose in particular to FIG. 3 of the drawing. The aforementioned special gear segment 128 has a thickness and width which is confined between the area a. Area a lies between two circular paths denoted with the numerals 156 and 158 in FIG. 3. The paths denoted with the numerals 156 and 158 are formed with the radius of formation R1 and R2 and are the pitch circles of the nontransitional gear segments 156a and 158a.

Special gear segment 128 is also confined between the limits set by the angle. The aforementioned angle W establishes the angular travel of the vane 32.

For purposes of completing the description of special gear segment 128, a description of the two transitional gear segment 148a and 150a will follow. Transitional gear segments 148a and 150a are essential for a continual engagement of the circular gear 130 and the segment gear denoted with the numeral 128. The transitional segments 148a and 150a lie within the aforedescribed area a.

Figure 3:
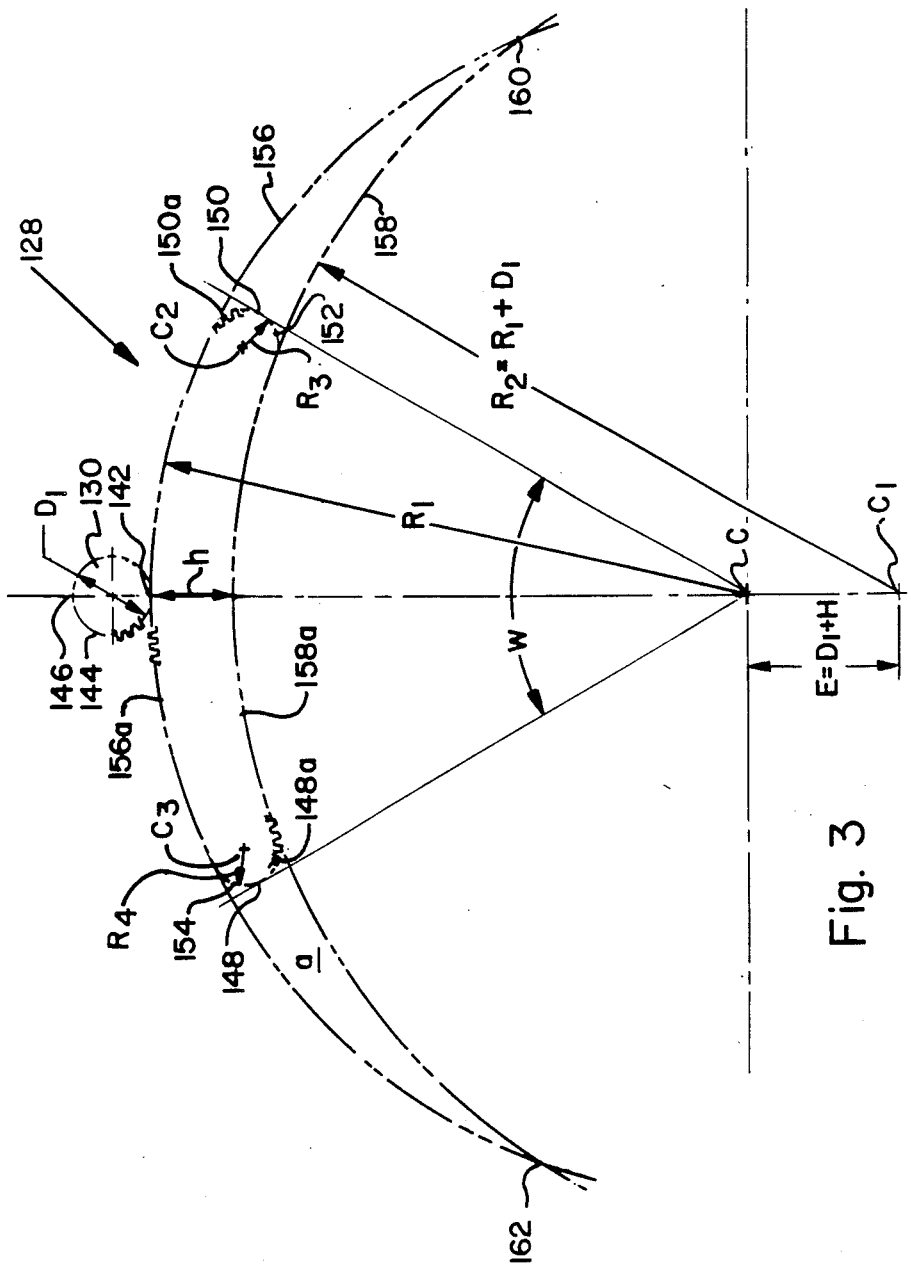
FIG. 3 is a schematic representation of the circular segment type path that the special segment type gear which is mounted on the movable assembly for movement therewith of the internal combustion engine embodying a motion-conversion mechanism constructed in accordance with the present invention that is depicted in FIG. 1 of the drawing follows during the course of the movable assembly's movement.

The pitch circle of transitional gear segment 148a lies on a circular path denoted with the numeral 148 in FIG. 3 of the drawing and formed with radius denoted with the letter R4. Two points of the circular path 148 of transitional gear segment 148a are in tangent with the two circular paths denoted with the numerals 156 and 158 in FIG. 3 of the drawing.

The pitch circle of transitional gear segment 150a lies on a circular path 150 and is formed with the radius R2. Two points of the circular path 150 of transitional gear segment 150a are tangent to the two circular paths 156 and 158.

Thus with circular paths 148 and 150 being tangent to the circular paths 156 and 158 the desired special continuous path essential for the special gear 128 is created.

Figure 4:
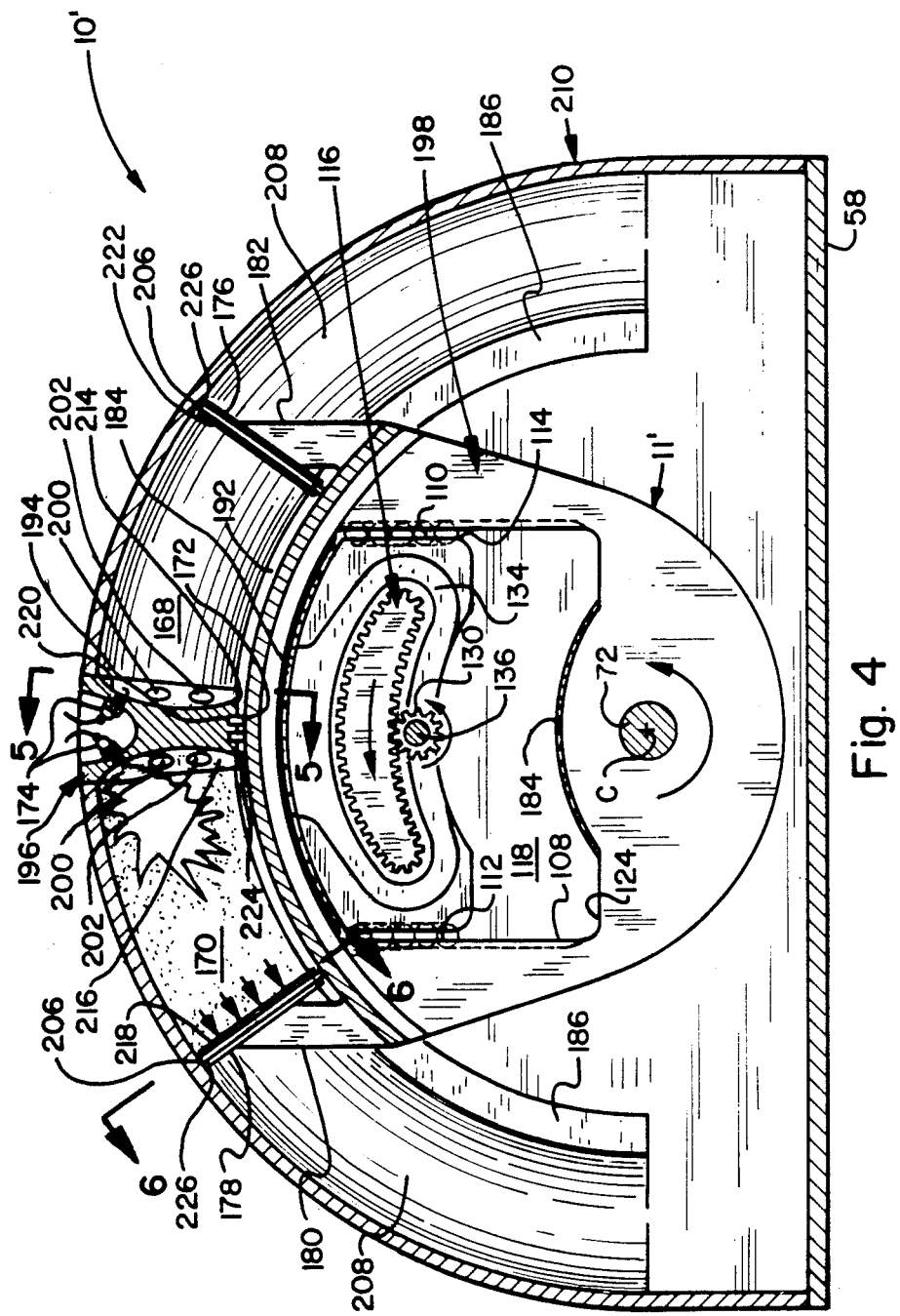
FIG. 4 is a side elevational view partially in section of a second embodiment of an internal combustion engine embodying a motion-conversion mechanism constructed in accordance with the present invention.
Figure 5:
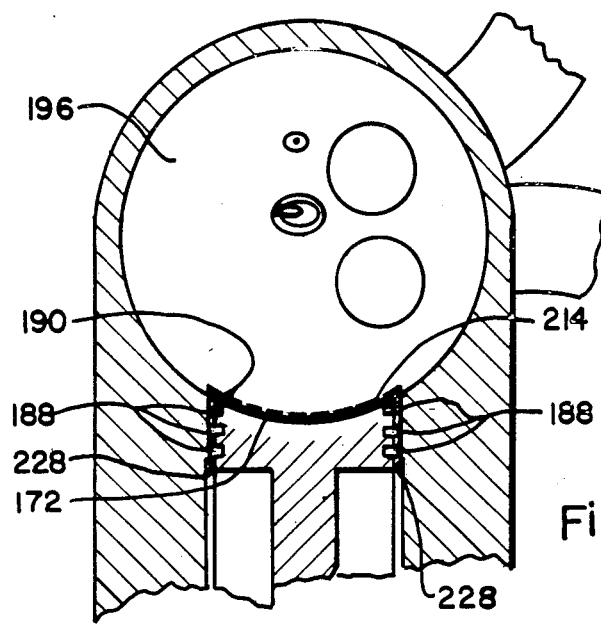
FIG. 5 is a cross-sectional view of a portion of the internal combustion engine embodying a motion-conversion mechanism constructed in accordance with the present invention depicted in FIG. 4 taken substantially along the line 5—5 in FIG. 4.
Figure 6:
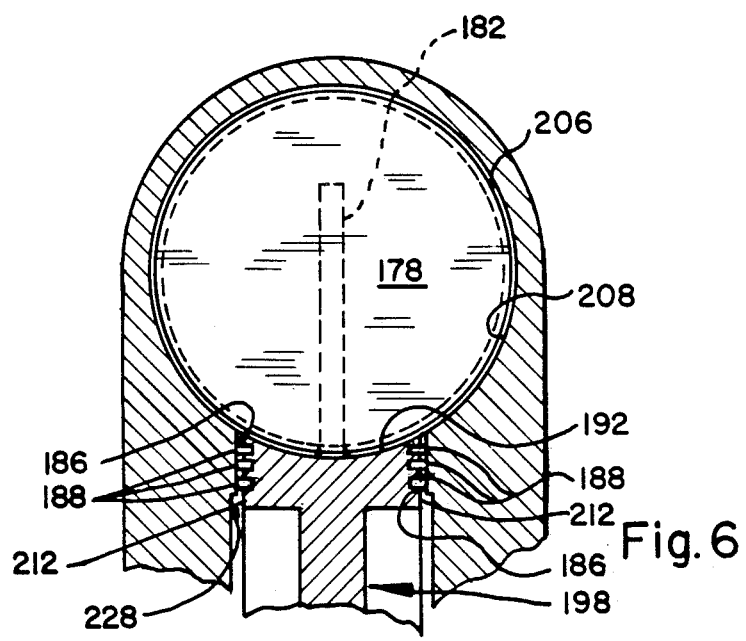
FIG. 6 is a cross-sectional view of a portion of the internal combustion engine embodying a motion-conversion mechanism constructed in accordance with the present invention depicted in FIG. 4 taken substantially along the line 6—6 in FIG. 4.
Figure 9:
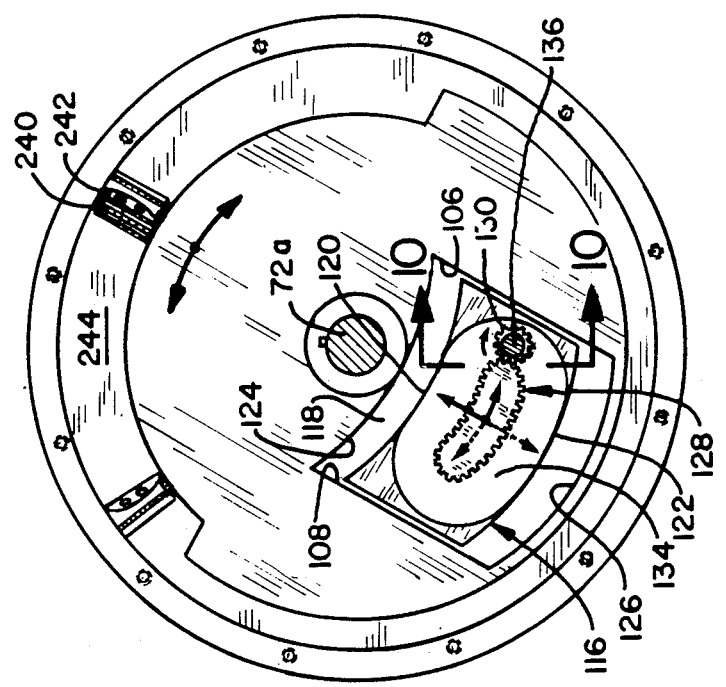
FIG. 9 is a cross-sectional view of the internal combustion engine embodying a motion-conversion mechanism constructed in accordance with the present invention depicted in FIG. 7 taken substantially along the line 9—9 in FIG. 7.

Next, a description will be set forth herein of the mode of operation of the internal combustion engine 10' equipped with the motion-conversion mechanism 11'. For ease of reference in this connection the same reference numerals have been employed in FIG. 4 of the drawing to identify those components of the motion-conversion mechanism 11 that have been described in detail herein previously. Continuing, as in the case of the internal combustion engine 10 equipped with the motion-conversion mechanism 11, combustion is designed to take place within the chamber-like portions 168 and 170 of the internal combustion engine 10'. To this end, the head portion 196 of the internal combustion engine 10' is provided, as illustrated in FIG. 4 of the drawing, with ignitors 174, that are of conventional construction. In a manner well-known to those skilled in the art of internal combustion engines, the ignitors 174 are designed so as to be operative to effect the ignition of the fuel and the air that are supplied, by means of any conventional form of supply suitable for use for such a purpose, to the interior of the chamber-like portions 168 and 170. The gases produced by this combustion of fuel and air in the chamber-like portions 168 and 170 in turn are operative to cause the piston-like members 176 and 178 to move to and fro within the chamber-like portions 168 and 170, respectively. By virtue of the fact that they are affixed thereto, this movement of the piston-like members 176 and 178 is transmitted to the rotor 198 and therethrough to the operating components of the motion-conversion mechanism 11'. As such, in the same manner as that described in detail hereinbefore in connection with the discussion of the motion-conversion mechanism 10, the movement of the rotor 198 is operative to cause the gear carrier 116 to slide in a vertical direction as viewed with reference to FIG. 4 of the drawing. The coaction that exists between the gear carrier 116 and the sliding means 110 makes it possible for this sliding movement to occur. Furthermore, as the gear carrier 116 slides up and down in a vertical direction, by virtue of the nature of the construction of the motion-conversion mechanism 11' which is similar to that of the motion-conversion mechanism 11 to which reference has previously been had herein, this sliding movement thereof is operative to cause the gear 130 to travel around the circumference of the segment gear 128. In doing so, the rotation of the gear 130 is imparted to the subject shaft 136 by virtue of the fact that the gear 130 is fixedly mounted on the output shaft 136 for rotation therewith. The output shaft 136 provides the output from the internal combustion engine 10'. Chambers 168 and 170 may vary in size in order to balance the power output as motion-conversion mechanism 11 moves from the near to the center c position to the further away from the center position (not shown) without departing from the essence of the invention. Reference will next be had to FIGS. 7, 8 and 9 of the drawing wherein yet another embodiment of an internal combustion engine equipped with a motion-conversion mechanism constructed in accordance with the present invention is depicted. To facilitate the description of the internal combustion engine equipped with a motion-conversion mechanism constructed in accordance with the present invention which is illustrated in FIGS. 7, 8 and 9 of the drawing, the same reference numerals are employed as those which have been employed hereinbefore to identify the same components. Continuing, the primary difference between the embodiment of FIGS. 7, 8, and 9 of the drawing and the embodiment of FIGS. 1-6 resides in the fact that in the case of the embodiment of FIGS. 7, 8 and 9 the internal combustion engine portion thereof and the motion conversion-mechanism portion thereof are separated one from another i.e., rather than lying in the same plane they are made to lie in parallel planes. More specifically, the rotor 64 of the embodiment of FIG. 1 of the drawing is now in the case of the embodiment of FIG. 7 formed in two sections, i.e., that identified in FIG. 7 by the reference numeral 64a and that identified in FIG. 7 by the reference numeral 64b. The effect thereof is that when combustion occurs in the chamber-like portions 230 and 234, the vane-like members 232 and 236 are made to rotate to and fro within the chamber-like portions 230 and 234, respectively. This rotation of the vane-like members 232 and 236 in turn causes the rotor 64a to likewise rotate by virtue of the fact that the vane-like members 232 and 236 are affixed thereto. Furthermore, the rotation of the rotor 64a is transmitted to the shaft 72a. The rotation of the shaft 72, in the manner described previously herein in connection with the discussion of the nature of the construction and the mode of operation of the embodiment of FIG. 1 of the drawing, results in sliding movement being imparted to the gear carrier 116 which in turn results in the gear 130 being caused to travel around the segment gear 128. Moreover, since the gear 130 is affixed to the output shaft 136, the latter also is made to rotate such as to provide an output therefrom. With further reference to the embodiment of FIGS. 7, 8 and 9, it is possible as a result of the nature of the construction thereof, i.e., through the use of the dual rotors 64a and 64b and the corresponding chamber-like portions associated therewith, to effect a further expansion of the gases produced during combustion such that the internal combustion engine is capable of being made to function in the manner of a turbocharger, or it is possible therewith to effect the compression of gases in the internal combustion engine preparatory to the occurrence of the intake stroke.

Figure 10:
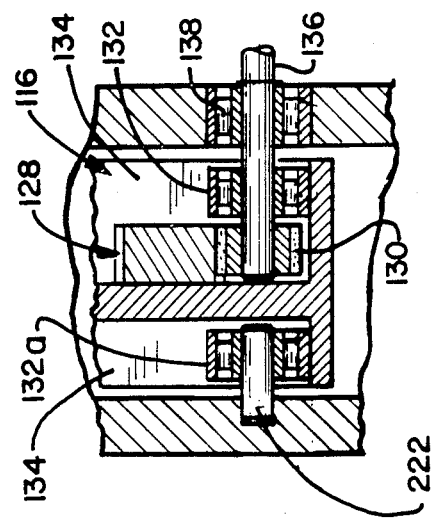
FIG. 10 is a cross-sectional view of a portion of the internal combustion engine embodying a motion conversion mechanism constructed in accordance with the present invention depicted in FIG. 7 taken substantially along the line 10—10 in FIG. 9.

Turning now to a consideration of FIG. 10 of the drawing, there is depicted therein an alternative way of accomplishing the supporting of the gear carrier 116. Namely, in accord with the illustration of FIG. 10, the follower roller 132 is depicted in a different location than that shown in FIG. 2 of the drawing and there is also provided an additional follower roller 132a. Through the use of this alternative form of construction, the gear carrier 116 is provided with additional support. To this end, the additional follower roller 132a is suitably mounted for movement on a stationary shaft 222. Obviously, however, other ways of supporting the gear carrier 116 other than those illustrated in the drawing and described herein might also be employed without departing from the essence of the present invention.

Figure 13:
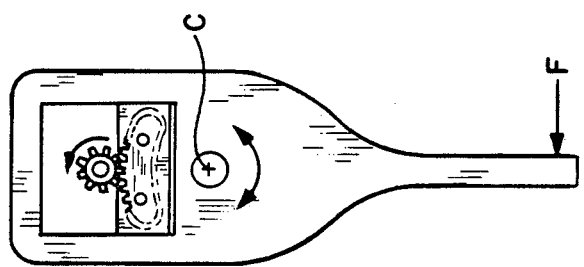
FIG. 13 is a schematic representation of a motion-conversion mechanism constructed in accordance with the present invention illustrating the manner in which in accordance with a third method of application thereof power is transferred thereby.
Figure 12:
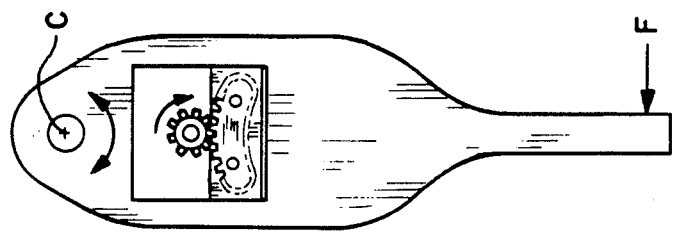
FIG. 12 is a schematic representation of a motion-conversion mechanism constructed in accordance with the present invention illustrating the manner in which in accordance with a second method of application thereof power is transferred thereby.
Figure 11:
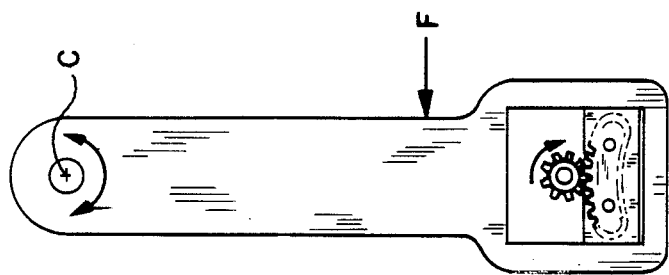
FIG. 11 is a schematic representation of a motion-conversion mechanism constructed in accordance with the present invention illustrating the manner in accordance with a first method of application thereof power is transferred thereby.

Reference will next be had to FIGS. 11, 12 and 13 of the drawing. These figures are intended to illustrate the manner in which power is transferred. To this end, in FIG. 11 the force vector F is shown acting at a point which is intermediate the location of the gear carrier and the centerline C of the internal combustion engine. On the other hand, in FIG. 12 the force vector F is shown acting at a point whereby the gear carrier lies between the force vector F and the centerline C of the internal combustion engine. Finally, in FIG. 13 the force vector F is shown acting at a point whereby the centerline C of the internal combustion engine lies between the gear carrier and the force vector F.

Figure 14:
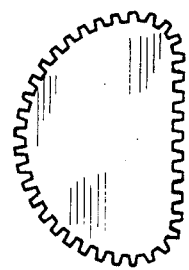
FIG. 14 is a side elevational view of a gear which can be employed in a motion-conversion mechanism constructed in accordance with the present invention for purposes of effecting variations in the time or speed of the strokes of combustion of the internal combustion engine with which the motion-conversion mechanism is cooperatively associated.

In FIG. 14 of the drawing there is depicted an alternative form of the segment gear 128. The form of segment gear that is illustrated in FIG. 14 is particularly suitable for use when there exists a need to vary the time or speed of a selected cycle or stroke of combustion.

In FIGS. 15, 16, 17 and 18 of the drawing the gear carrier 116 is illustrated in various stages of movement. More specifically, in FIG. 15 the gear carrier 116 is shown in its lowermost position. In FIG. 16 the gear carrier is shown as having moved upwardly slightly from its position in FIG. 15 and also in FIG. 16 the gear 130 is shown as having moved from its position in FIG. 15. In FIG. 17 the gear carrier 116 is shown as having moved even further in an upwardly direction and also in FIG. 17 the gear 130 is shown as having moved further from its position in FIG. 15. Finally, in FIG. 18 the gear carrier 116 is shown in its uppermost position and also in FIG. 18 the gear 130 is shown as having moved even further from its position in FIG. 15.

Thus, in accordance with the present invention there has been provided a new and improved motion-conversion mechanism suitable for use in an internal combustion engine for purposes of effecting the conversion of oscillating motion into a continuous circular motion which can be employed as a means of imparting rotation to a power output shaft. Moreover, there is provided in accord with the present invention a motion-conversion mechanism particularly suited for use in an internal combustion engine which is characterized in that it is possible therewith to realize an increase in the power output of the internal combustion engine by virtue of maximizing the utilization of the expanded gases that are generated during the combustion which takes place in the combustion chamber of the internal combustion engine. Also, in accordance with the present invention the subject motion-conversion mechanism particularly suited for use in an internal combustion engine is characterized in that it is possible therewith to achieve variations in the speed and in the power output of the internal combustion engine. Further, the subject motion-conversion mechanism which is particularly suited for use in an internal combustion engine is characterized in that it is possible therewith to maximize the expansion stroke in order to achieve the concomitant benefits that flow therefrom. In addition, in accordance with the present invention the subject motion-conversion mechanism which is particularly suited for use in an internal combustion engine is characterized in that it is possible therewith to attain a tighter gas seal in the combustion chamber from that which one is normally capable of achieving in a rotary engine that is of conventional construction. Ultimately, the subject motion-conversion mechanism which is particularly suited for use in an internal combustion engine is characterized in that it is possible therewith to increase or decrease the time that it takes to accomplish the various strokes of combustion. Finally, in accordance with the present invention the subject motion-conversion mechanism which is particularly suited for use in an internal combustion engine is advantageously characterized by its ease of manufacture and its ease of assembly, as well as by the fact that it is relatively inexpensive to provide.

While several embodiments of my invention have been shown, it will be appreciated that still other modifications thereof, some of which have been alluded to hereinabove, may still be readily made thereto by those skilled in the art. I, therefore, intend by the appended claims to cover the modifications alluded to herein as well as all other modifications which fall within the true spirit and scope of my invention.

Figure 19:
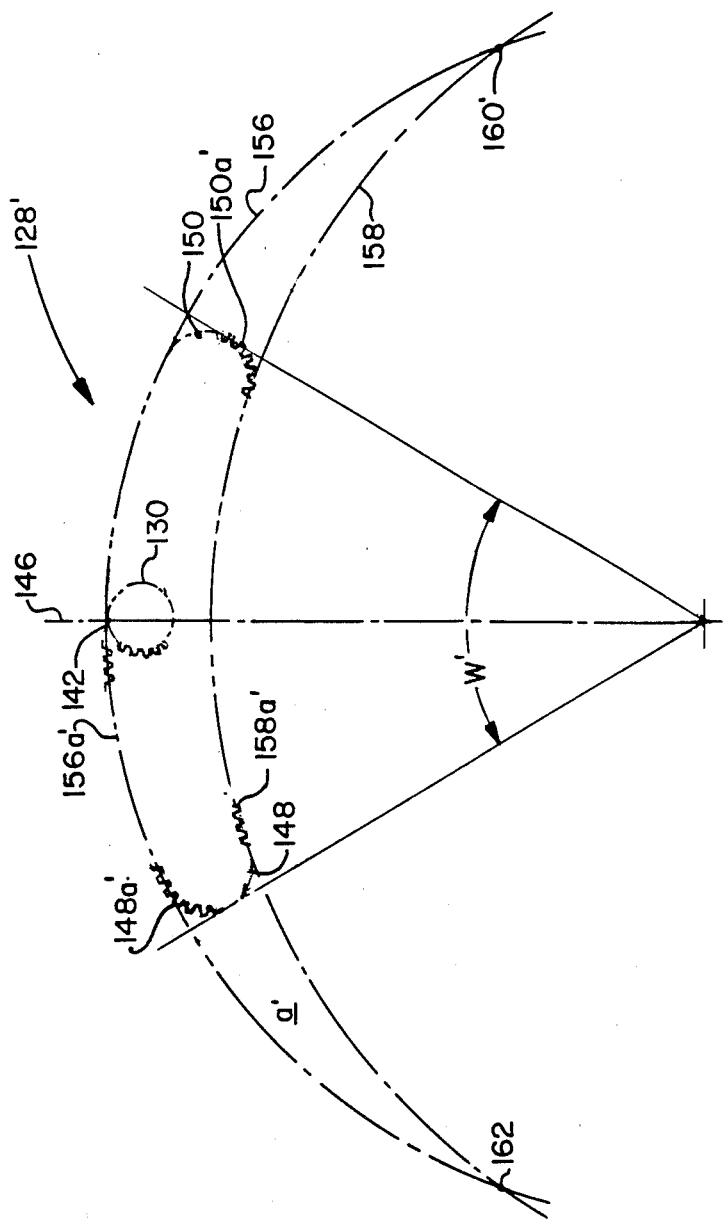
FIG. 19 is a side elevational view of a special segment internally teethed gear constructed in the same principles as shown in FIG. 3 and is employed in a motion-conversion mechanism constructed in accordance with the present invention that is depicted in FIG. 19 of the drawing follows during the course of the movable assembly's movement.
Figure 20:
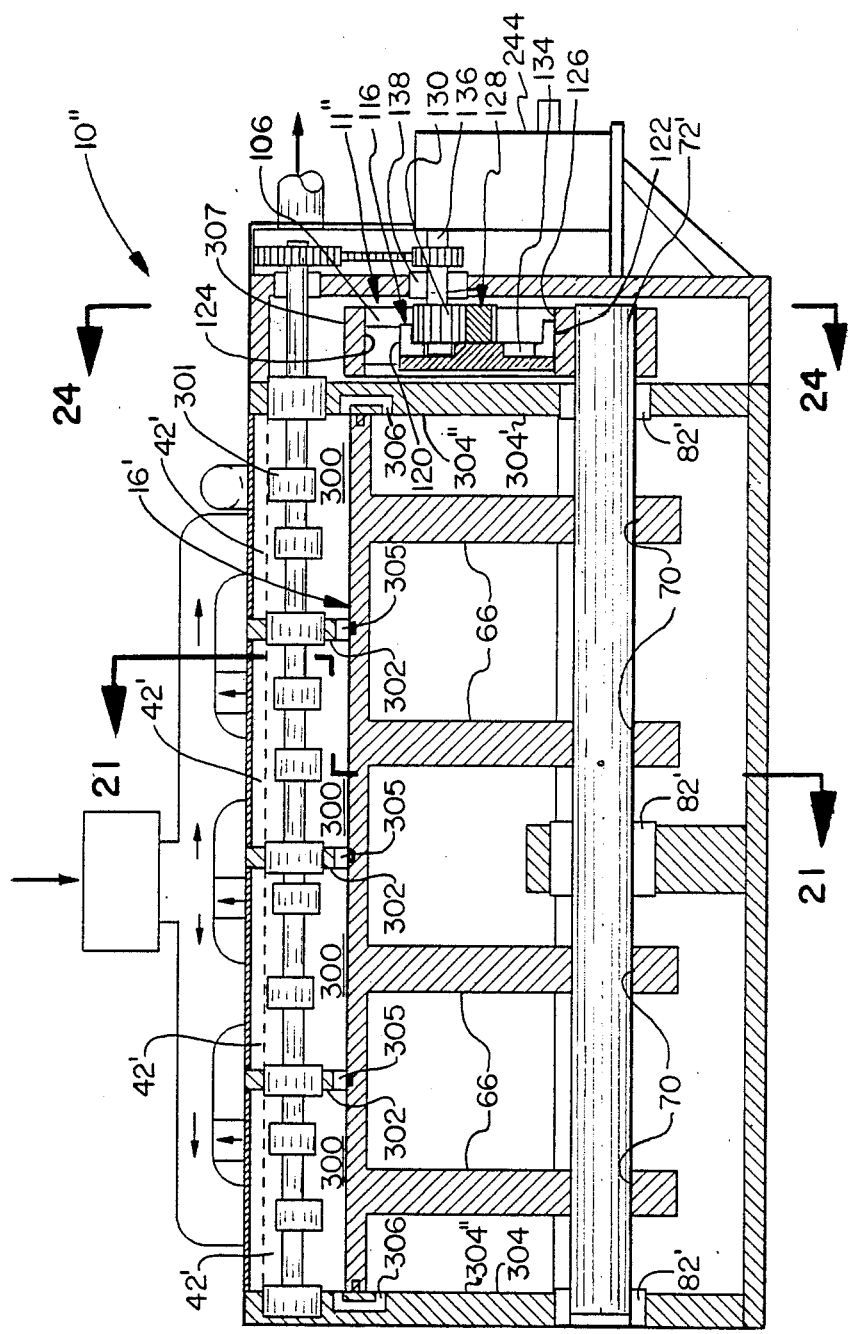
FIG. 20 is a side elevational view partially in section of a fourth embodiment of an internal combustion engine embodying a motion-conversion mechanism constructed in accordance with the present invention.
Figure 21:
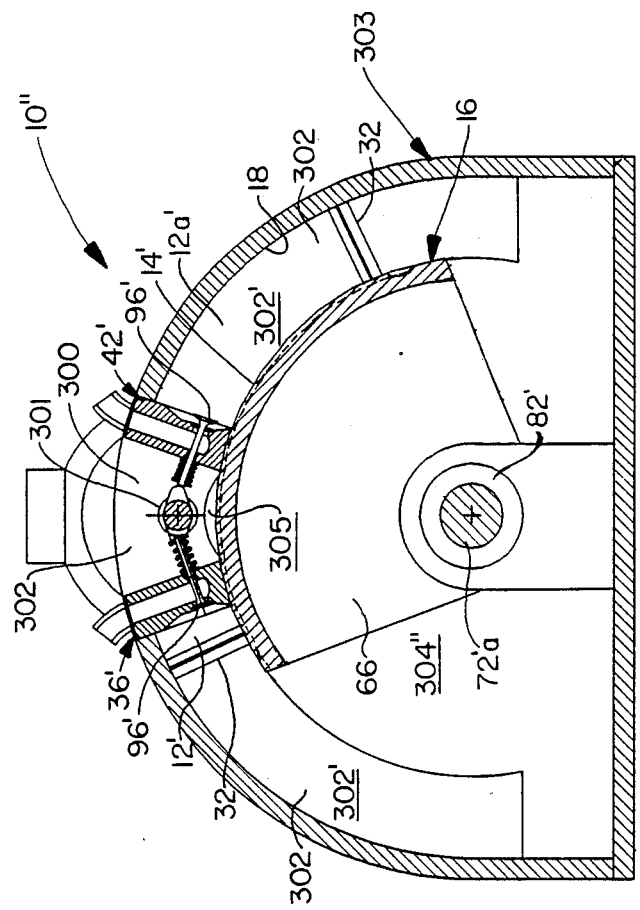
FIG. 21 is a cross-sectional view of the internal combustion engine embodying a motion-conversion mechanism constructed in accordance with the present invention depicted in FIG. 20 and FIG. 22 taken substantially along the line 21—21 in FIG. 20 and FIG. 22.
Figure 24:
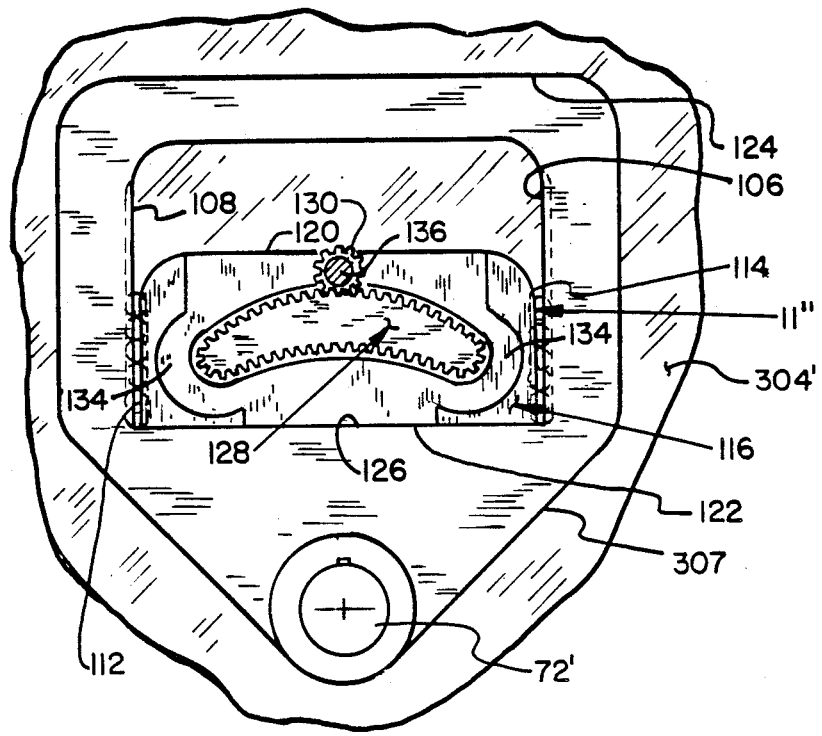
FIG. 24 is a cross sectional view of the internal combustion engine embodying a motion-conversion mechanism constructed in accordance with the present invention depicted in FIG. 20 taken substantially along the line 24—24 in FIG. 20.
Figure 25:
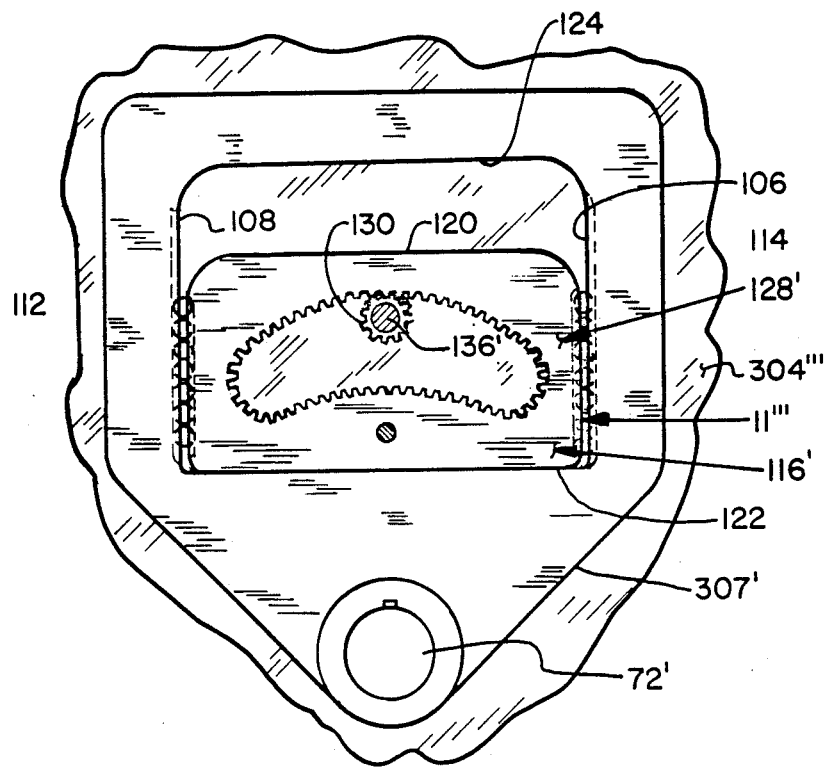
FIG. 25 is a cross sectional view of the internal combustion engine embodying a motion-conversion mechanism constructed in accordance with the present invention depicted in FIG. 22 and FIG. 23 taken substantially along the line 25—25 in FIG. 22 and FIG. 23.

Reference will next be had to FIG. 19 of the drawing, wherein a special gear segment denoted with the numeral 128' is internally teethed and constructed in the same principle as special gear segment 128 in FIG. 3 of the drawing. Special gear 128' in FIG. 19 is employed in motion-conversion mechanism in the same manner as special gear segment 128 in FIG. 3 of the drawing;

Next a description will be set forth herein of the mode of operation of the internal combustion engine denoted with the numeral 10" equipped with the motion-conversion mechanism 11". For ease of reference in this connection the same reference numerals have been employed in FIGS. 20 and FIG. 21 in the drawing to identify those components of the motion-conversion mechanism 1 that have been described in detail herein previously. Continuing, as in the case of the internal combustion engine 10 equipped with the motion-conversion mechanism 11, combustion is designed to take place within the multi-chamberlike portions 12' and 12a' of the internal combustion engine 10". To this end, the head portions 36' and 42' of the internal combustion engine 10" are provided as illustrated in FIG. 20 and FIG. 21 of the drawing with gas outlet means 96' and air or air mixture inlet means of conventional construction, omitted from the drawings in interest of maintaining clarity of illustration therewithin. The air or air mixture inlet means (not shown) and the gas outlet means 96' are designed to open and close in synchronous relationship one with another in a conventional fashion through the use of a cam shaft 301 to supply the combustion chamber 12' and 12a'. Said head portions 36' and 42' are parted in order to provide as open spaces 300 for the location of cam shaft 301 and the exposure for lubrication of surface 14' of the multi-vane unirotor 16' and with cam shaft 301 being supported in a mounting relation for rotation on the division members 302 of multi-divided stator body 303, on engines end members 304 and 304' and on the cover of the motion-conversion mechanism 308 of the internal combustion engine 10" in FIG. 20 and FIG. 21 of the drawing. Division members 302 which are fixedly supported on the multi-divided stator 303, are provided with an undercut 305 to permit the free flow of lubricant and with end members 304 and 304' provided with opening 306 in order to allow the drainage of the above said lubricants. Vanes 32 are fixedly mounted on the multi-vane unirotor 16' which is in turn fixedly mounted on the engine's semi-rotating shaft 72a, on which in turn is fixedly mounted the carrier member 307 of the motion-conversion mechanism 116. Continuing, as in the case of the internal combustion chamber 10 equipped with the motion-conversion mechanism 11. Combustion is designed to take place within the chamber-like portions 12' and 12a' which are formed between the side 302' of the stator division member 302 and the inner sides 304' of the engine's end members 304 and 304' of the internal combustion engine 10". The gases produced by this combustion of fuel or mixture in turn are operative to cause the piston-like vanes 32 to move to and fro within the chambers-like portions 12' and 12a' respectively. By virtue of the fact that they are affixed thereto, this movement of the piston-like vanes 32 is transmitted to the multi-vane unirotor 16' and therethrough the semi-rotating shaft 72' to the operating components of the motion-conversion mechanism 11". As such, the same manner as that described in detail hereinbefore in connection with the discussion of the motion-conversion mechanism 10, the movement of the member portion 307 of the motion-conversion mechanism 11" is operative to cause the gear carrier 116 to slide in a vertical direction as viewed with reference to FIG. 24 of the drawing. The coaction that exists between the gear carrier 116 and the sliding means 110 makes it possible for this sliding movement to occur. Furthermore, as the gear carrier 116 slides up and down in a vertical direction, by virtue of the nature of the construction of the motion-conversion mechanism 11" which is similar to that of the motion-conversion mechanism 11 to which reference has previously been had therein, this sliding movement thereof is operative to cause the gear 130 to travel around the circumference of the segment gear 128. In doing so, the rotation of the gear 130 is imparted to subject shaft 136 by virtue of the fact that the gear 130 is fixedly mounted on the output shaft 136 for the rotation therewith. The output shaft 136 provides the output from the internal combustion engine 10".

Figure 22:
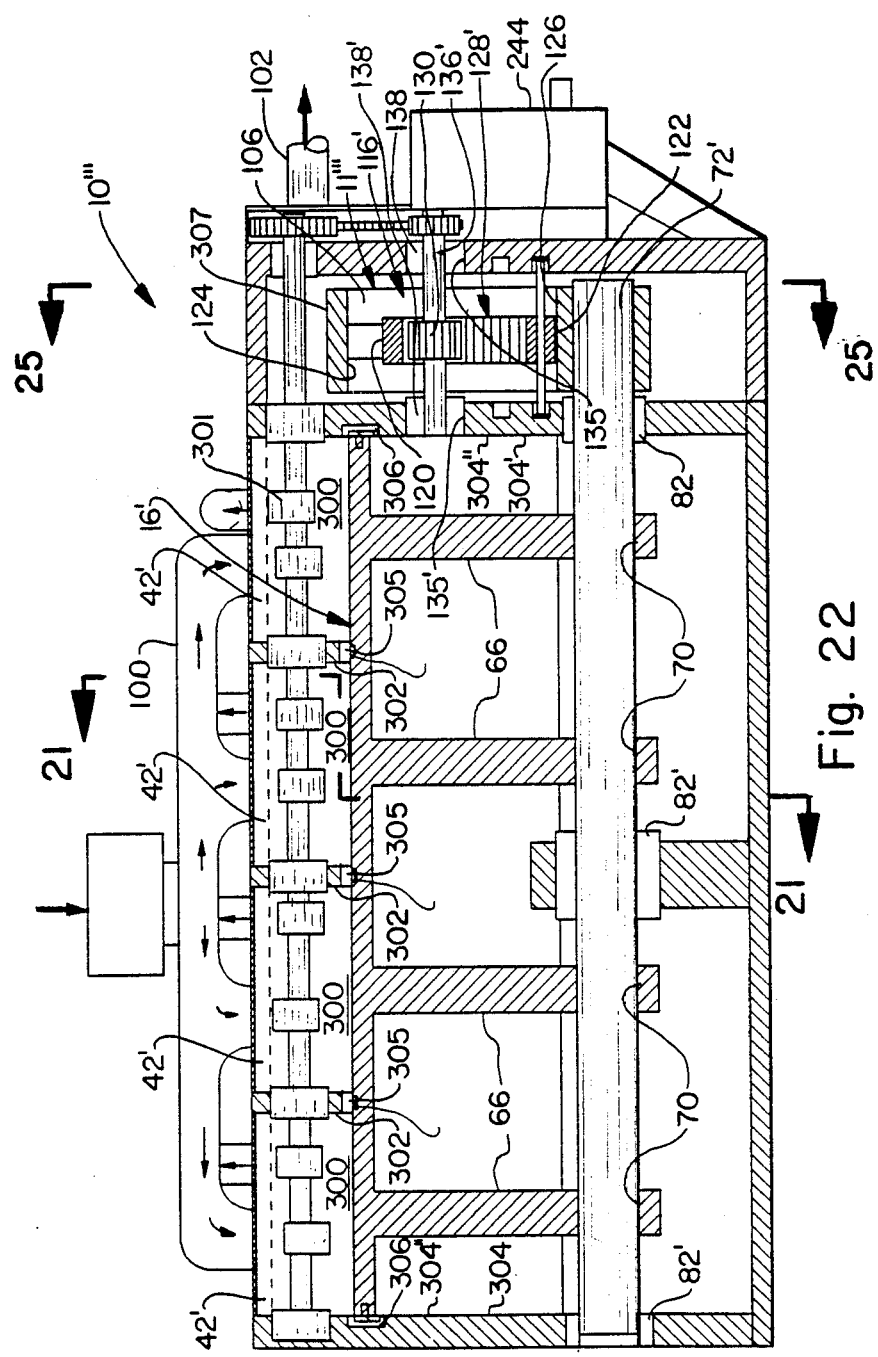
FIG. 22 is a side elevational view partially in section of a fifth embodiment of an internal combustion engine embodying a motion-conversion mechanism constructed in accordance with the present invention.
Figure 23:
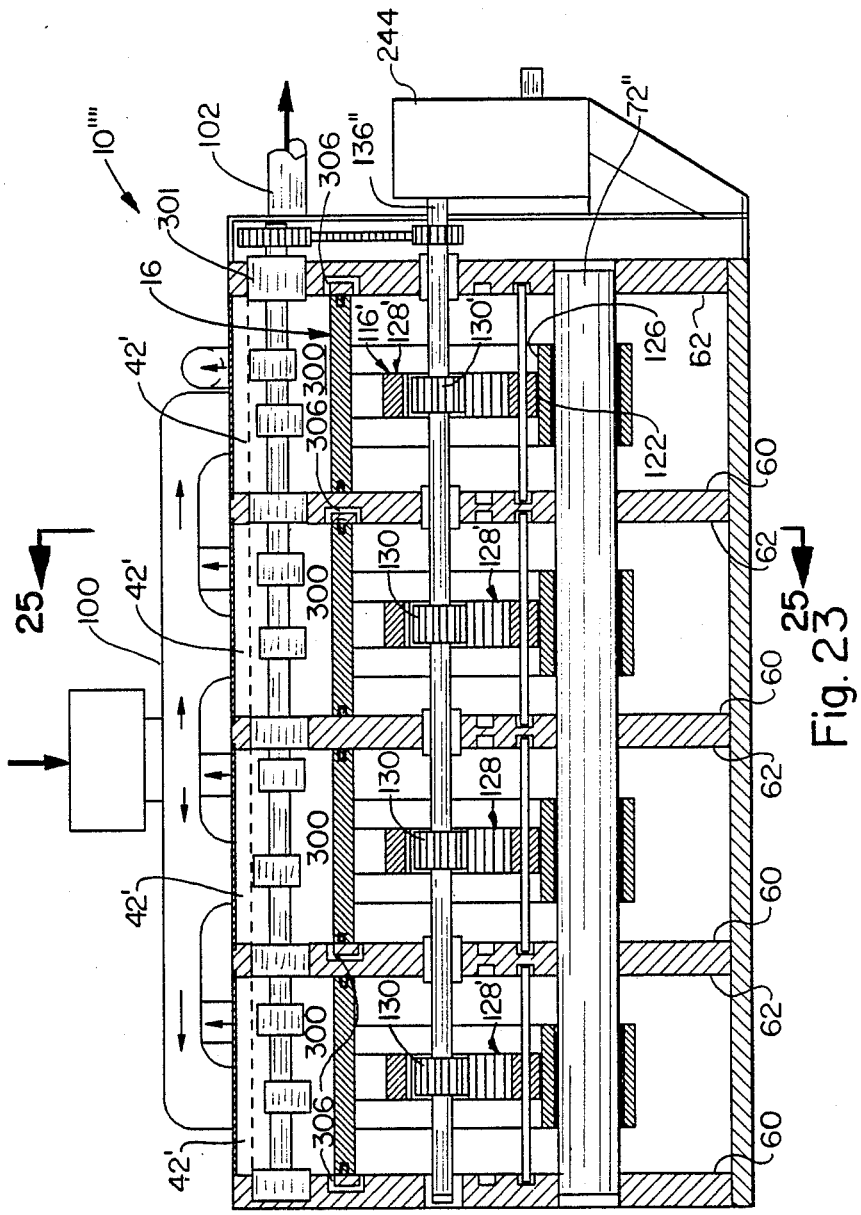
FIG. 23 is a side elevational view partially in section of a sixth embodiment of an internal combustion engine embodying a motion-conversion mechanism constructed in accordance with the present invention.

Reference will be next be made to FIG. 22 of the drawing, wherein yet another embodiment of the internal combustion engine equipped with a motion-conversion mechanism constructed in accordance with the present invention as depicted. To facilitate the description of the internal combustion engine equipped with a motion-conversion mechanism constructed in accordance with the present invention which is illustrated in FIG. 22 of the drawing. The same reference numerals are employed as those which have been employed herein before to identify the same components. Continuing the primary difference between the embodiment of FIG. 22 of the drawing and the embodiment of FIGS. 1-21 reside in the fact that in the case of the embodiment 22 the motion-conversion mechanism 11''' employs and internally teethed gear segment 128" instead of an aforementioned externally teethed segment gear 128.

What is claimed is:

1. In an internal combustion engine including rotor means having an opening provided therein, combustion chamber means formed on said rotor means, and means supported in said combustion chamber means for movement therewithin in response to the forces generated by the gases created when combustion takes place in said combustion chamber means acting thereon and operative as a consequence of the movement thereof to impart oscillating movement of said rotor means into a continuous circular motion, the improvement of a motion-conversion mechanism for converting oscillating motion to a continuous circular motion, said motion-conversion mechanism comprising:

(a) a gear carrier supported in mounted relation in the opening provided in said rotor means for slidable movement therewithin between a first position and a second position;

(b) a segment teethed gear supported in mounted relation on said gear carrier for movement therewith, said segment teethed gear including a first curvilinear portion having a plurality of teeth, a second curvilinear portion having a plurality of teeth, a first interconnection portion having a plurality of teeth and a second interconnection portion having a plurality of teeth, said first curvilinear portion embodying a first radius of curvature R1, said first radius of curvature R1 being the radius of formation of a first gear pitch circle, said plurality of teeth of said first curvilinear portion lying on said first gear base pitch circle created by said first radius of curvature R1, said second curvilinear portion embodying a second radius of curvature R2, said second radius of curvature R2 being the radius of formation. of a second gear base pitch circle, said plurality of teeth of said for the second curvilinear portion lying on said second gear base pitch circle created by said second radius of curvature R2, said first radius of curvature R1 and said second radius of curvature R2 defining therebetween a variable are denoted by the letter a, said variable area a having a variable width, said segment teethed gear being confined within said variable area a, said first interconnection portion embodying a third radius of formation R3, said third radius of curvature R3 being the radius of formation of a third gear base pitch circle, said plurality of teeth of said first interconnection lying on said third base pitch circle created by said third radius of curvature R3, said second interconnection portion embodying a fourth radius of curvature R4, said fourth radius of curvature R4 being the radius of formation of a fourth gear base pitch circle, said plurality of teeth of said second interconnection portion lying on said fourth gear base pitch circle created by said fourth radius of curvature R4, said first curvilinear portion having a first end and a second end, said second curvilinear portion having a first end and a second end, said first interconnection portion interconnecting said first end of said first curvilinear portion to said first end of said second curvilinear portion, said second interconnection portion interconnecting said second end of said first curvilinear portion to said second end of said second curvilinear portion, said first curvilinear portion and said second curvilinear portion, and said first interconnection portion and second interconnection portion collectively defining the 360 degree circumference of said segment teethed gear;

(c) an output shaft supported on said gear carrier for movement therewith, said output shaft being operative to provide an output from the internal combustion engine; and (d) a gear provided with external teeth supported on said output shaft in surrounding relation thereto, said gear being supported in mounted relation relative to said teethed segment gear for movement around said 360 degree circumference of said segment teethed gear as said gear carrier with said segment teethed gear mounted for movement therewith moves between said first portion and said second portion, said gear as said gear moves around said 360 degree circumference of said segment teethed gear imparting rotation to said output shaft so as to thereby produce an output from the internal combustion engine.

2. In an internal combustion engine, the improvement of a motion-conversion mechanism as set forth in claim 1 wherein said segment gear is provided with external teeth.

3. In the internal combustion engine as set forth in claim 1 wherein said segment gear is provided with internal teeth.

4. In an internal combustion engine as set forth in claim 1 including stator means having opening provided therein, combustion chambers means formed within said stator means, and means supported on rotor means in said combustion chamber means for movement therewithin in response to the forces generated by the gases created when combustion takes place in said combustion chamber means acting thereon and operative as a consequence of the movement thereto impart oscillating movement of said rotor means, a motion-conversion mechanism converting said oscillator movement into continuous circular motion, the improvement of a internal combustion engine for providing the oscillating movement to motion-conversion mechanism from a multi-combustion chamber stator engine with a simple multi-vane rotor, said internal combustion engine comprising:

(a) a multi-combustion chamber stator body provided with means for supporting in mounted relation in an opening a multi-vane rotor for oscillating movement therewithin between a first position and the second position (b) a multi-vane rotor supported in mounting relation in said multi-combustion chamber stator body for movement therein, said multi-vane rotor including a plurality of piston-like vanes mounted fixed in at least one row in a peripheral way along center axis on the external smooth cylindrical surface of a cylindrical rotor segment, with each of said vanes having two of their sides positioned parallel to the cylindrical rotor segments center axis, with two other sides being perpendicular to the rotor center axis, member stiffeners means attached fixedly perpendicular to the cylindrical rotor segment center axis in the internal cylindrical surface of said cylindrical rotor segment, shaft whereon are fixedly mounted said rotor stiffener means is supported in a mounted relation on stators bearing means for semi-rotating movement therein, said semirotating shaft extends one of its ends beyond the stator bearing means for fixed support of a member portion, wherein a gear carrier supported in mounted relation in the opening provided in said member portion means for slidable movement therewithin between a first position and a second position;

(c) said multi-combustion chamber stator body including a plurality of continuous circular segment dividers member means attached fixedly on the inner smooth cylindrical surfaces of two circular segment sections which are parted to create an open space essential for lubrication and in order to accept a plurality of engine head portions, a cam shaft supported on two engines end member means and said divider member means is operating the valves of said engines head portions, said engine's end member means are providing an opening for location of bearing means wherein the shaft of the multi-vane rotor is supported in a mounted relation for a semi-rotating movement.

* * * * *